Nov. 10, 1925.  
F. B. BETTS, JR  
1,560,529  
COMBINATION BUG COLLECTOR AND SPRAYING APPARATUS  
Filed May 10, 1922  
2 Sheets-Sheet 2
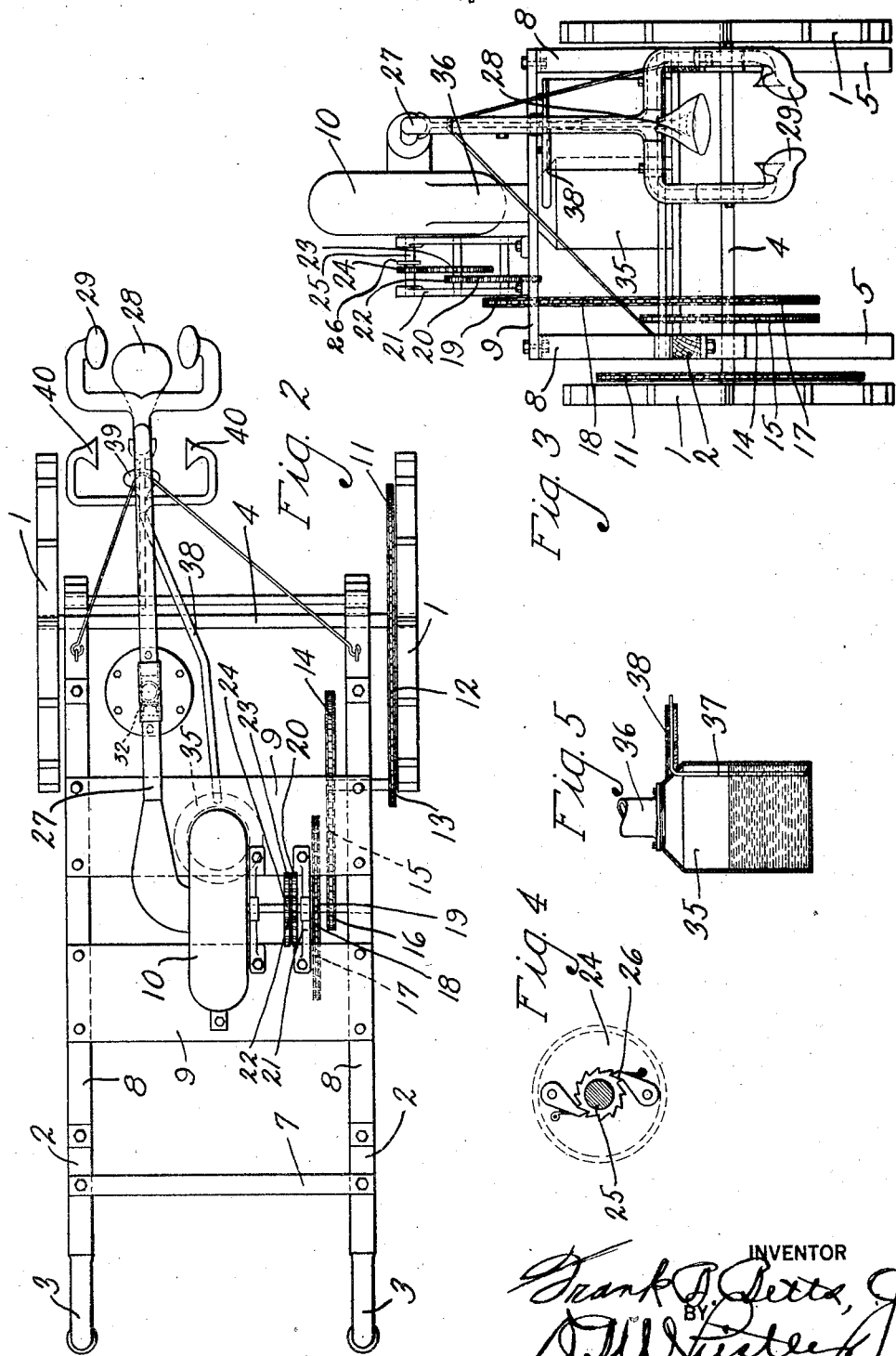
INVENTOR  
Frank B. Betts, Jr  
BY  
ATTORNEY

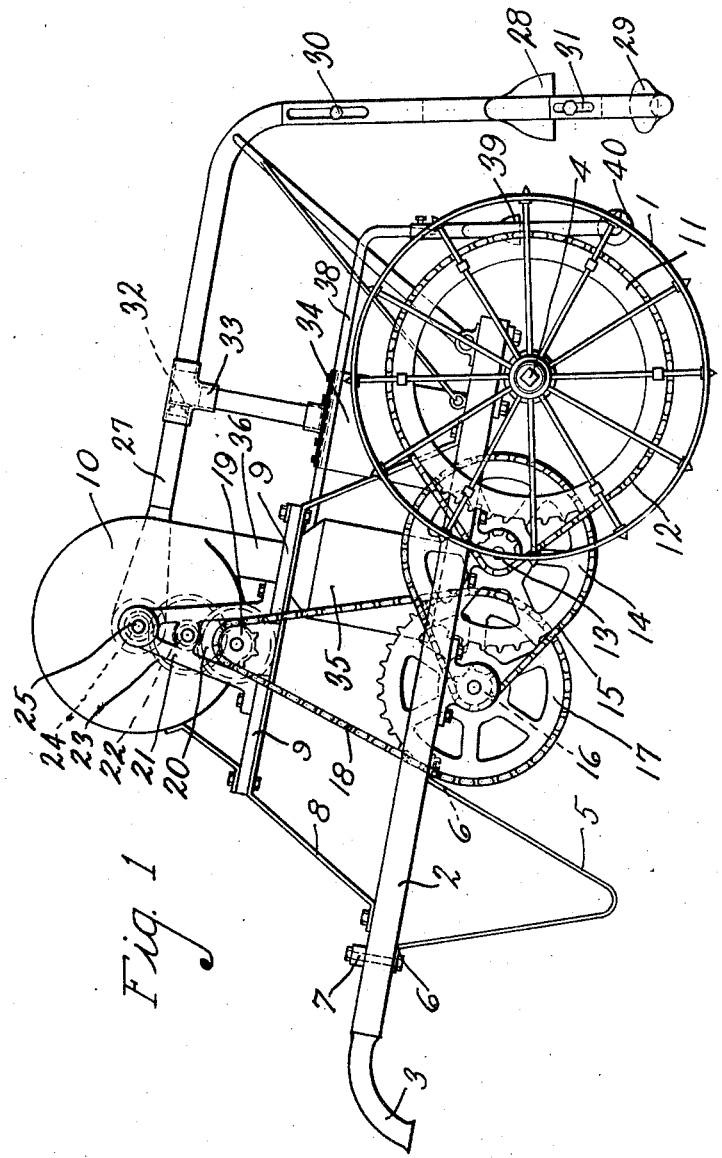

Patented Nov. 10, 1925.

1,560,529

UNITED STATES PATENT OFFICE.

FRANK B. BETTS, JR., OF DAYTON, OHIO.

COMBINATION BUG COLLECTOR AND SPRAYING APPARATUS.

Application filed May 10, 1922. Serial No. 559,789.

*To all whom it may concern:*

Be it known that I, FRANK B. BETTS, Jr., a citizen of the United States, residing in Dayton, in the county of Montgomery and State of Ohio, have invented certain new and useful Improvements in Combination Bug Collector and Spraying Apparatus or the like, of which the following is a specification, reference being had therein to the accompanying drawings.

This invention relates to a novel agricultural apparatus—a combination bug collector and sprayer—having particular reference to a machine adapted to collect bugs off growing plants, as potato plants, and other plants which require attention to prevent injury thereto by bugs or insects of any kind,—the machine being further adapted to spray the plants at the same time the bugs are removed therefrom, or independently thereof.

The main object of the invention is to provide an apparatus of this character which will be of simple construction and cheap to manufacture, which can be furnished to the user at low cost and which will be effective for its intended purposes.

The machine is intended to be a time and labor saver, and, more especially, a crop saver,—it being well known that the damage to various crops, particularly to potato crops, and other vegetable and plant crops, resulting from infesting insects which breed and feed on the leaves of the plants, is very great in the average season,—there being no machine or mechanical means for collecting insects from field plants known to the applicant prior to the present invention.

The apparatus of the present invention consists of a light hand-operated, wheeled implement, adapted to be moved rapidly over a row of plants, and to generate its own power for removing the insects from the plants by suction, and, if desirable, for spraying the plants at the same time. The implement being light and requiring but little strength to propel, can be operated by a child, and the average acreage of crops of the kind named can have the bugs removed therefrom, and be sprayed in a very short time.

While my invention is here shown in a simple, hand-operated machine to illustrate the underlying principles of the invention and a preferred form of construction,—it will be obvious, of course, that the basic idea of invention here shown can be applied in a power operated machine, and that various modifications can be made in the general arrangement of the machine and detail features of construction without departing from the spirit of the invention, or principles of construction and operation defined in the appended claims.

In the accompanying drawings, which serve to illustrate an embodiment of my invention in one form:

Fig. 1 is a side elevation of the combination apparatus;

Fig. 2 is a plan view of the machine;

Fig. 3 is an end view of the machine as viewed from the rear;

Fig. 4 is a detail view of the fan driving mechanism;

Fig. 5 is a detail view of a feature of the sprayer mechanism.

As here shown, the combined apparatus is mounted on a wheeled carriage comprising ground wheels —1 and side frames —2,—the frames being extended rearwardly to provide push handles —3 for propelling the machine,—the wheels being mounted on a common axle —4, upon which the rear end of the machine frame is pivoted to move up and down vertically,—the forward part of the frame being normally supported above the ground by downwardly extended leg-braces —5,—the upper ends of each of the braces being bolted to one of the side frames —2 as indicated at —6,—the frames —2 being spaced apart and braced transversely one relative to the other by a cross brace —7. A supplemental frame supported on side frames —2 and extended upwardly therefrom consists of opposite side truss frames —8 joined one to the other by front and rear cross frames —9.

The combination bug collector and sprayer is supported on the wheeled carriage above described and consists of a fan or blower —10, which may be of any suitable size and construction, and which is mounted on the cross frames —9.

The fan as here shown, is operatively connected to one of the ground wheels —1 by a sprocket chain, and gear drive, comprising a main drive, sprocket gear —11, secured to the ground wheel, a sprocket chain —12 traversing gear —11 and a gear —13 secured to an intermediate sprocket gear —14 supported on one of the side frames —2. A sprocket chain —15 traverses gear —14 and a gear —16 secured to a second intermediate sprocket gear —17 also supported on the same frame —2. A sprocket chain —18 traverses gear —17 and a gear —19 secured to an intermediate spur gear —20 mounted on a bracket —21 extended upwardly from one of the truss frames —8,— gear —20 being the driving gear in a train of spur gears comprising gears —20, —22, —23, and —24,—gear —24 being secured to the spindle —25 of fan —10.

From the foregoing description of the fan driving mechanism, it will be seen that the speed of the ground wheel gear —11 will be five times compounded at the fan spindle, thus producing a relatively high speed of the fan,—the ratio of the gearing being determined as required for the most effective operation of the machine. In the train of gearing —20 —22 —23 and —24, the gear ratios may be varied by using different size gears on the different gear centers thus to increase or reduce the speed as may be desired. As illustrated in the drawings, best shown in detail Fig. 4, a pawl and ratchet drive —26 is interposed between gear —24 and the fan spindle,—thus to provide for free operation of the fan in the forward direction by momentum, to prevent excessive strain on the fan operating mechanism, when the implement carriage is brought to a stop.

A suction pipe —27 is connected to the fan housing at its central portion and is carried rearwardly over the end of the implement carriage and is then brought downwardly to bring the intakes —28 and —29 in close proximity with the top and opposite sides of the plants. To adapt the intakes —28 and —29 to the height of the plants, provision is made, as illustrated at —30 and —31, to adjust the same longitudinally of pipe —27,—the intakes —29 being set at an angle to adapt the same to the spread of the plants, and off-set, or located off-center to the line of travel of the machine to permit the operator to walk along the side of the row of plants.

It will be obvious that the suction of the fan will act to draw bugs and insects of every kind feeding on the plants into pipe —27. To prevent the same entering the fan, a screen 32 is interposed in pipe —27, and an outlet —33 to the pipe is directed into a receptacle —34 into which the collection off the plants is discharged,—receptacle —34 being readily removable from the machine to remove the insects therefrom.

The spraying apparatus includes a receptacle —35 suitable for containing the liquid,—the fan having a blow pipe —36 opening into the receptacle. The pressure is formed in the upper portion of the receptacle and the liquid is forced upwardly through a pipe —37 into the discharge pipe —38 and sprayer heads —39 and —40,—the latter being arranged similar to the intakes —28 and —29 to adapt the same to the height and spread of the plants.

From the foregoing detailed description the construction and operation of the combination bug collector and sprayer will be readily understood. It will be seen that it is a very simple machine that will have relatively high power for both the suction and spraying functions, and that both the bug collector and spraying operations can be effected simultaneously or one independent of the other as may be desired. The intakes —28 and —29 and sprayer heads —39 and —40 being detachable either set can be removed at will, when only one operation is to be made.

Having described my invention, I claim:

1. An implement of the character described, including in combination with a wheeled carriage, a suction device mounted on said carriage and operably connected therewith, a connection extended from said device, adapted to receive the insects sucked therethrough, and having a plurality of intakes connected thereto arranged in different planes, angularly disposed and adjustable vertically as a unit and also relatively one to another to adapt the same to the size of plants to be operated on, and adapted to be advanced with the travel of said carriage along a row of plants in close proximity to the plants to subject the same to the suction of said device.

2. An implement of the character described, including in combination with a wheeled carriage, a frame pivotally supported at one end on the wheel axle of said carriage, and provided at its opposite end with handles for manually propelling the implement over the ground, a suction apparatus and a receptacle supported on said frame having a tubular connection extended therefrom and inclined toward the ground, a plurality of intake devices arranged on the inclined portion of said tubular connection at different elevations, adjustable collectively relative to the ground and separately relative to each other, and adapted to be moved in the travel of the vehicle into relation with plants, a geared ground wheel, and compounded gearing interposed between said wheel and said suction device whereby upon forward movement being given the vehicle, operative movement at relatively higher speed will be imparted to said apparatus and a suction action will result through said tubular connection on said plants to collect and deliver insects therefrom into said receptacle.

In testimony whereof, I affix my signature.

FRANK B. BETTS, Jr.